Jan. 8, 1929.
P. J. MARTIN
1,698,165
VEHICLE FOR CHILDREN
Filed Sept. 25, 1923    3 Sheets-Sheet 1
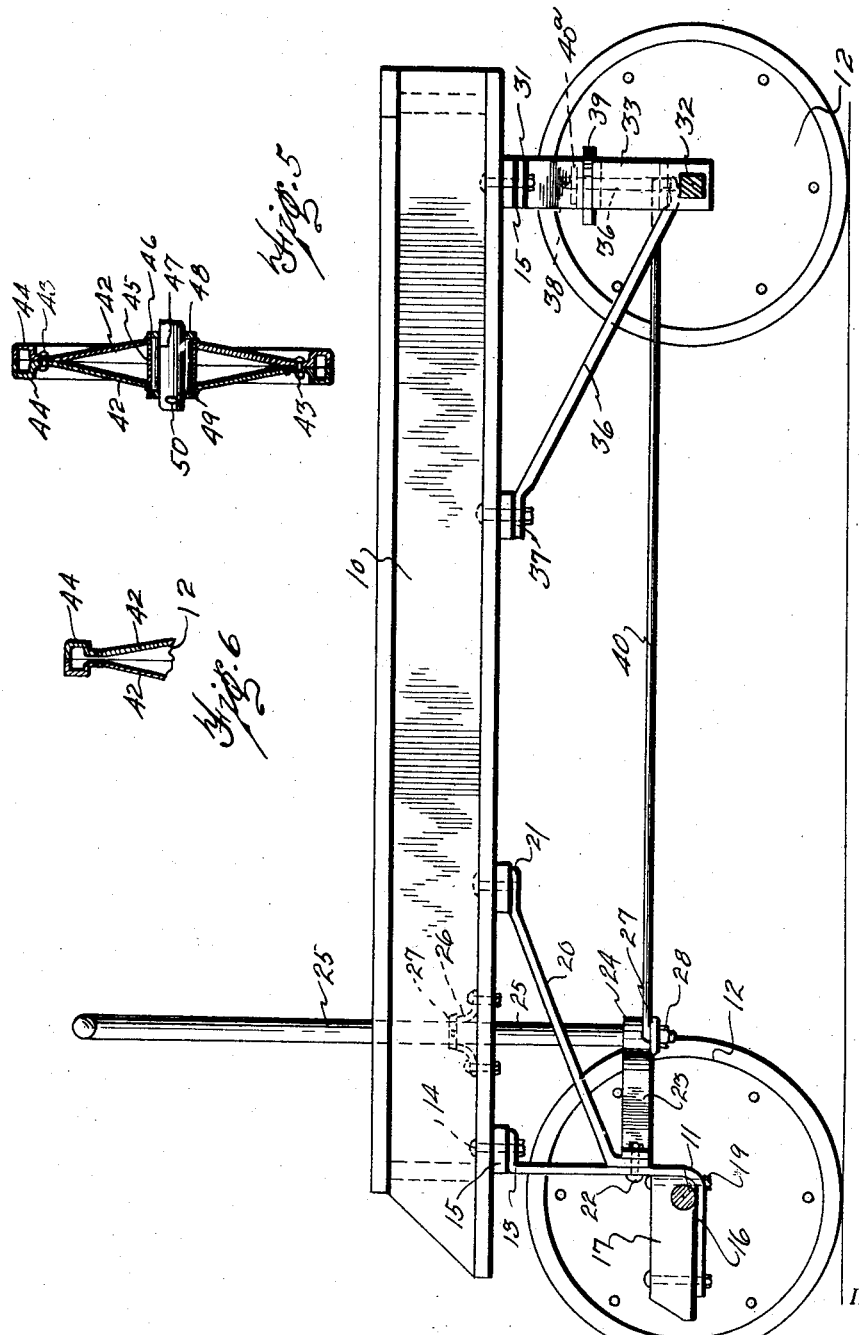
INVENTOR.
BY Philip J. Martin
Ralzemond A. Parker
ATTORNEY.

Jan. 8, 1929.
P. J. MARTIN
1,698,165
VEHICLE FOR CHILDREN
Filed Sept. 25, 1923    3 Sheets-Sheet 2
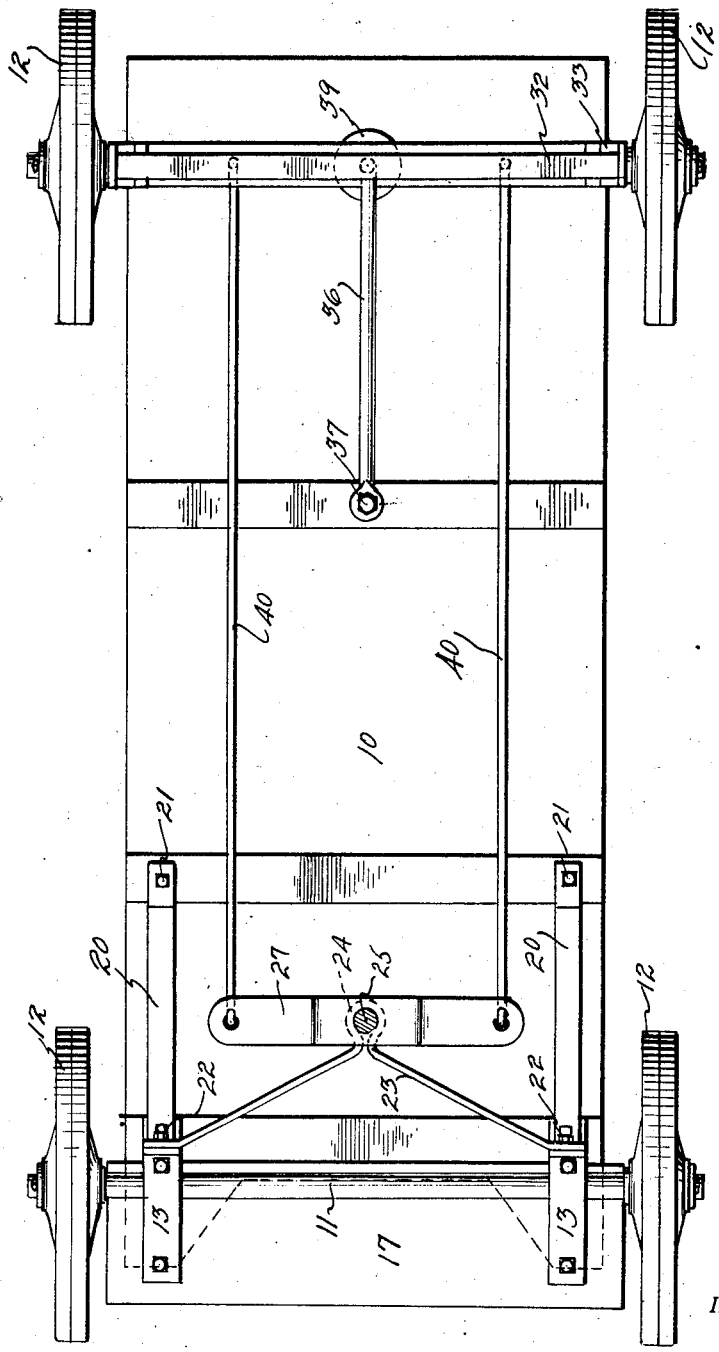
INVENTOR.
BY  Philip J. Martin
Ralzemond A. Parker
ATTORNEY.

Jan. 8, 1929.  
P. J. MARTIN  
1,698,165  
VEHICLE FOR CHILDREN  
Filed Sept. 25, 1923  
3 Sheets-Sheet 3
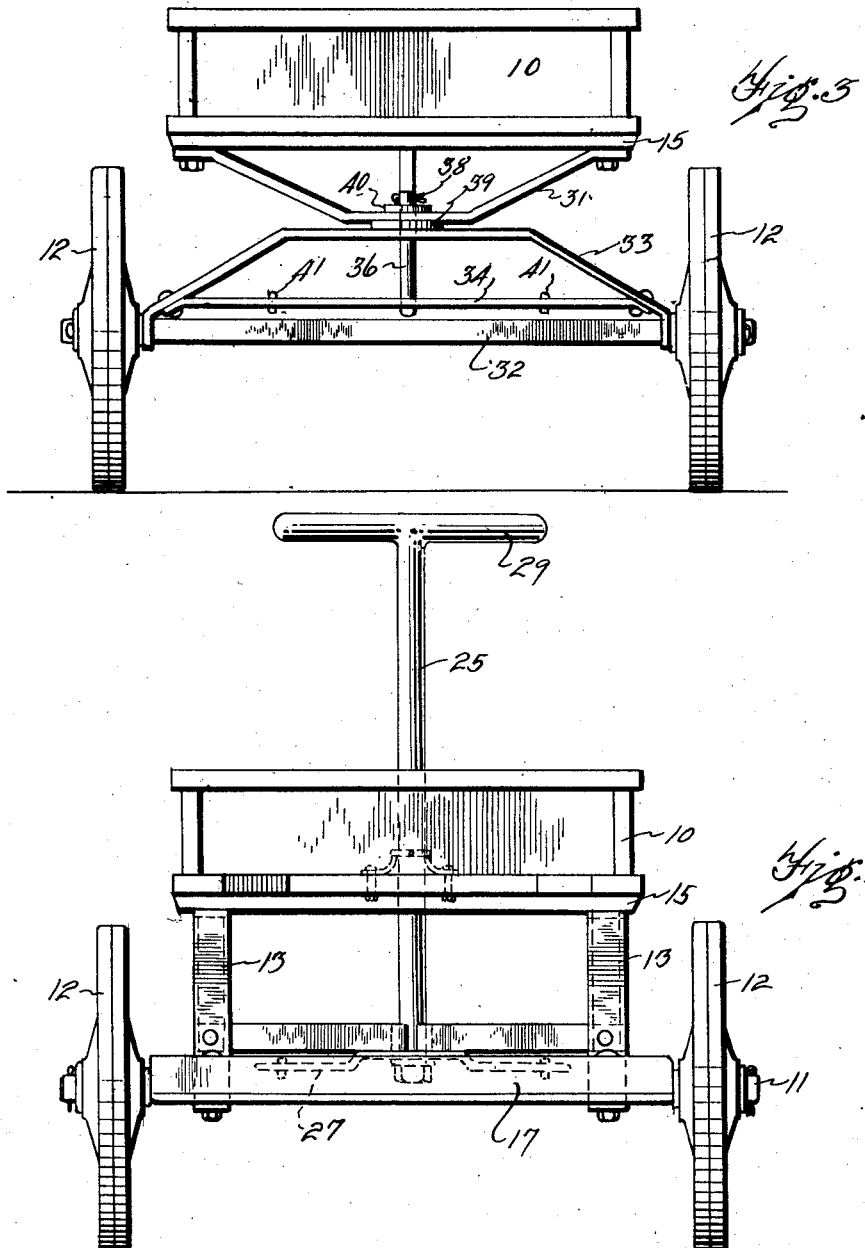
INVENTOR.  
Philip J. Martin  
BY Ralzemond A. Parker  
ATTORNEY.

Patented Jan. 8, 1929.

1,698,165

UNITED STATES PATENT OFFICE.

PHILIP J. MARTIN, OF DETROIT, MICHIGAN.

VEHICLE FOR CHILDREN.

Application filed September 25, 1923. Serial No. 664,668.

My invention relates to improvements in vehicles for children. This invention is particularly intended to be applied to a child's vehicle of the express wagon type such as are adapted for commercial use, as for example, by newsboys in the selling of papers.

Many different kinds of children's vehicles are in use. Certain types are propelled by pedals connected with the wheels for driving; others are moved along by the occupant pushing first with one foot and then the other upon the pavement; but the express wagon type is as a rule propelled from the rear by a boy resting one knee in the rear end of the box and pushing with the opposite foot against the pavement to propel the vehicle. My invention relates to improvements in vehicles of this latter type and an object is to so construct such a vehicle that it is particularly well adapted for propulsion in the above fashion and easily and conveniently steered from the rear.

Another object of importance is to provide such a vehicle of simple, sturdy construction capable of carrying a substantial load in the forward end of the box and adapted for propulsion by an occupant standing or seated at the rear end of the box pushing with one foot against the pavement and provided with steering mechanism disposed at the rear for convenient operation during such propulsion.

An additional advantageous feature of construction is the provision of improved double disk traction wheels for the vehicle.

The above objects and others, together with other meritorious features of construction will more fully appear from the description of the embodiment of my invention illustrated in the accompanying drawings and also the appended claims.

In the drawings,—

Figure 1 is a side elevation of my improved vehicle.

Fig. 2 is a plan of my improved vehicle.

Fig. 3 is a front elevation of the vehicle illustrated in Figs. 1 and 2.

Fig. 4 is a rear elevation of the vehicle illustrated in Figs. 1 and 2.

Fig. 5 is a cross-sectional view through my improved disk wheel.

Fig. 6 is a cross-sectional view through my improved wheel, the separate disks not drawn together by the rivets.

In the drawings, let 10 indicate a wagon box having cross frame members 15 and supported in the front and at the rear by suitable wheel trucks. The rear wheel truck comprises an axle 11 supported on wheels 12. Each wheel structure is hereinafter more particularly described. The box is supported on the axle by a truck frame comprising a pair of angle members 13 one secured to each side of the box body by bolts 14 which extend through the bottom of the body and the cross frame member 15.

Each member 13 is bent as at 16 to extend rearwardly underneath the axle, as shown in Fig. 1, and the axle is secured thereto. These rearwardly projecting portions 16 of the members 13 which extend underneath the axle support a step 17 secured by bolts 19 to the angle members 13. These sides also hold the axle 11 firmly in place. Each angle piece 13 is braced from the body by a member 20 secured as at 21 to the body and at 22 to the member 13. I provide a supporting bracket 23 secured at opposite ends by bolts 22, which hold the brace 20 in place, to the two angle members 13 to extend forwardly thereof, as appears in Figs. 1 and 2. This bracket is shaped so as to provide a bearing 24 for steering post 25.

The steering post extends upwardly through the bottom of the box 10 and has another bearing 26 at a point above the box bottom. The steering post carries a stop 27 above bearing 26 and a nut 28 below bearing 24 and is provided at its lower end with cross bar 27 to oscillate therewith. The steering post is provided with a handle 29 so as to be easily manually operated.

The forward end of the vehicle carries a rigid transverse supporting member 31 and is supported by a wheel truck axle 32 which carries at each end a wheel 12. The axle 32 is provided with a rigid transverse support 33 which is braced by a cross rod 34. I provide a brace 36 secured at 37 to an intermediate portion of the body and extending forwardly and downwardly therefrom underneath the cross rod 34 and turned upwardly forwardly of said cross rod to pass through the transverse supports 31 and 33 and a bearing plate 39 interposed between such supports to swivel the front axle of the body. A cotter pin 38 is inserted through an aperture in the end of the brace beyond a washer 40ª to hold the members together.

To provide for steering of the vehicle from the rear by a rider standing with one foot on the rear step or seated in the rear of the wagon, I make use of connecting rods 40 which extend forwardly from each end of the cross bar 27 to the front axle and engage over the tie rod 34 as at 41. By means of these connecting rods it is possible to steer the vehicle from the handle 25.

I provide an improved type of double disk wheel which has been found particularly suitable for a wagon of this character. It is of a sturdy construction, simple and inexpensive to manufacture. This wheel comprises a pair of complementary sheet metal disks 42. These disks are secured together at a plurality of points spaced from the outer peripheries by means of bolts or rivets 43. Each disk is shaped, beyond the points at which the disks are secured together, to form an axially channelled rim flange 44. These channelled flanges 44 of the disks in the pair register so that a hollow rim is formed, the bearing surface of which rim comprises the outer side walls of the channels 44. The channel of each disk is formed as appears in Fig. 6 with the outer flange of a greater width than the opposite side wall of the channel so that when the disks are juxtaposed the outer side walls of the channels contact first, as will appear in such Fig. 6, and the disks are drawn together by the rivets against the inherent tension of the disks, as appears in Fig. 5. The disks flare apart from the points at which they are secured together as they approach the axle and the two disks are held in spaced apart relationship at their inner peripheries by a tubular member 45, which is turned over at each end as at 46 to engage the adjacent disk at the inner periphery. I provide roller bearings 47 between the tubular member 45 and the axle. The wheel is held axially against displacement between an inner plate 48 and an outer plate 49, which outer plate may be held removably in place by a cotter pin 50.

This vehicle is particularly adapted as one to be used in the carrying of loads of considerable quantity which may be placed in the forward end of the wagon box. The carried load of the rider is well over the rear axle and the steering mechanism is disposed in such proximity to the step 17 that it may be easily operated by one occupying such step.

What I claim is:

1. In a vehicle of the class described, a body, a front axle, a brace for the axle secured to the body rearwardly of the axle and extending forwardly to the axle and turned upwardly to pivot the axle to the body for turning movement.

2. A vehicle having a wagon box, a front axle swiveled at one end of the box and provided with a pair of front wheels, a rear axle at the opposite end of the box provided with a pair of rear wheels, a platform step depending from the rear end of the box and supported directly upon the rear axle and extending rearwardly therefrom, a steering post bearing in the rear end of the floor of the box, a second steering post bearing carried by the platform step in line with the first bearing and positioned therebelow, a steering post mounted in said bearings and extending upwardly through the box in operable proximity to the platform step, and steering connections between the steering post and the front axle.

3. A vehicle having front wheels mounted upon a swiveled front axle, rear wheels upon a rear axle, a wagon-box supported thereupon, angular supports depending from the rear end of the box and secured to the rear axle and extending rearwardly therefrom, a platform step carried upon said supports rearwardly of the rear axle, a bracket extending forwardly from said supports and provided at its forward end with a steering post bearing, a second steering post bearing in the rear end of the floor of the box in line with the first mentioned bearing and a steering post extending through the box and mounted in said bearings, and steering connections between said post and the front axle below the box.

In testimony whereof, I sign this specification.

PHILIP J. MARTIN.